(12) United States Patent
Zhang (10) Patent No.: US 11,404,965 B2
(45) Date of Patent: Aug. 2, 2022

(54) DC-DC CONVERTER, ON-BOARD CHARGER, AND ELECTRIC VEHICLE

(71) Applicant: BYD COMPANY LIMITED, Guangdong (CN)

(72) Inventor: Xiaobin Zhang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 18 days.

(21) Appl. No.: 17/050,124

(22) PCT Filed: Apr. 25, 2019

(86) PCT No.: PCT/CN2019/084329
§ 371 (c)(1),
(2) Date: Oct. 23, 2020

(87) PCT Pub. No.: WO2019/206231
PCT Pub. Date: Oct. 31, 2019

(65) Prior Publication Data
US 2021/0067048 A1    Mar. 4, 2021

(30) Foreign Application Priority Data

Apr. 26, 2018 (CN) .................. 201810386529.X (51) Int. Cl.
*H02M 3/335*    (2006.01)
*H02J 7/00*    (2006.01)
(Continued)

(52) U.S. Cl.
CPC ......... *H02M 3/33584* (2013.01); *B60L 50/66* (2019.02); *B60L 53/20* (2019.02);
(Continued)

(58) Field of Classification Search
CPC ........... H02M 3/33584; H02M 3/33592; H02J 7/007; H02J 2207/20; H02J 2310/48; B60L 2210/10; B60L 50/66; B60L 53/20
(Continued)

(56) References Cited

U.S. PATENT DOCUMENTS 10,003,267 B1 *   6/2018   Zhao et al. ....... H02M 3/33507
10,340,810 B2 *   7/2019   Achtzehn et al. .... H02M 3/158
(Continued)

FOREIGN PATENT DOCUMENTS

CN        101841244 A    9/2010
CN        202218161 U    5/2012
(Continued)

OTHER PUBLICATIONS

PCT International Search Report, PCT/CN2019/084329, dated Jul. 29, 2019, 4 Pages.
(Continued)

*Primary Examiner* — Sun J Lin
(74) *Attorney, Agent, or Firm* — Fenwick & West LLP (57) ABSTRACT

A DC-DC converter includes: a first three-phase bridge module, a resonance module, a second three-phase bridge module, and a controller. The second three-phase bridge module is configured to: adjust frequency of an input signal of a battery module during discharging; and in a light load mode, the controller is configured to: control the first three-phase bridge module to switch to a two-phase bridge arm input or a one-phase bridge arm input and the second three-phase bridge module to switch to a two-phase bridge arm output, and control the second three-phase bridge module to switch to a two-phase bridge arm input or a one-phase bridge arm input and the first three-phase bridge module to switch to a two-phase bridge arm output during discharging, thereby reducing a switch loss in the light load mode.

20 Claims, 4 Drawing Sheets (51) Int. Cl.
  *B60L 53/20* (2019.01)
  *B60L 50/60* (2019.01)

(52) U.S. Cl.
  CPC ......... *H02J 7/007* (2013.01); *H02M 3/33592* (2013.01); *B60L 2210/10* (2013.01); *H02J 2207/20* (2020.01); *H02J 2310/48* (2020.01)

(58) Field of Classification Search
  USPC ........................................................ 320/128
  See application file for complete search history.

(56) References Cited

U.S. PATENT DOCUMENTS

| | | | |
|---|---|---|---|
| 2011/0068740 A1* | 3/2011 | Ang ........................ | H02J 7/022 |
| | | | 320/109 |
| 2014/0225439 A1 | 8/2014 | Mao | |
| 2014/0368175 A1 | 12/2014 | Ryoo et al. | |
| 2015/0015219 A1 | 1/2015 | Ishino et al. | |
| 2015/0180350 A1 | 6/2015 | Huang et al. | |
| 2019/0097543 A1 | 3/2019 | Achtzehn et al. | |
| 2020/0007022 A1* | 1/2020 | De Doncker et al. ........................ | |
| | | | H02M 3/3376 |
| 2020/0007030 A1* | 1/2020 | De Doncker ..... | H02M 3/33592 |
| 2020/0119655 A1* | 4/2020 | Ichinose et al. ..... | H05K 1/0203 |
| 2020/0119660 A1* | 4/2020 | Takahashi ............. | H02M 7/003 |
| 2020/0120789 A1* | 4/2020 | Ishikawa et al. .... | H05K 7/2089 |
| 2020/0313443 A1* | 10/2020 | ElMenshawy et al. ..................... | |
| | | | H02M 3/33584 |
| 2021/0067048 A1* | 3/2021 | Zhang ..................... | H02J 7/007 |
| 2021/0099097 A1* | 4/2021 | Zhang ..................... | H02M 3/01 |

FOREIGN PATENT DOCUMENTS

| | | |
|---|---|---|
| CN | 102812628 A | 12/2012 |
| CN | 203851025 U | 9/2014 |
| CN | 104506039 A | 4/2015 |
| CN | 105871215 A | 8/2016 |
| CN | 106411162 A | 2/2017 |
| CN | 107017816 A | 8/2017 |
| CN | 107294392 A | 10/2017 |
| CN | 107659161 A | 2/2018 |
| CN | 107757388 A | 3/2018 |
| DE | 102016006549 A1 | 11/2017 |
| EP | 2958222 A1 | 12/2015 |
| JP | 2014-079145 A | 5/2014 |
| WO | WO 2018/024655 A1 | 2/2018 |

OTHER PUBLICATIONS

European Patent Office, Extended European Search Report, EP Patent Application No. 19792280.0, dated Dec. 16, 2021, eight pages.

Japan Patent Office, Office Action, JP Patent Application No. 2020-559440, dated Jan. 4, 2022, six pages.

* cited by examiner

DC-DC CONVERTER, ON-BOARD CHARGER, AND ELECTRIC VEHICLE

CROSS-REFERENCE TO RELATED APPLICATIONS

This application is the National Stage of International Application No. PCT/CN2019/084329, "DCDC Converter, Vehicle-Mounted Charger and Electric Vehicle," filed on Apr. 25, 2019; which claims priority to Chinese patent application No. 201810386529.X filed on Apr. 26, 2018. The entire content of both of the above-referenced applications are incorporated herein by reference.

FIELD

The present disclosure relates to the field of vehicle technologies, and in particular, to a DC-DC converter, an on-board charger including the DC-DC converter, and an electric vehicle mounted with the on-board charger.

BACKGROUND

With the continuous development of electric vehicles, battery modules of the electric vehicles have increasingly high capacities. To reduce a charging/discharging time, a high-capacity battery module requires a higher-power bidirectional on-board charger (hereinafter referred to as an on-board charger). Currently, a power level of a mainstream on-board charger in the industry is single-phase 3.3 KW/6.6 KW. With further requirements for high-power on-board chargers, three-phase 10/20/40 KW on-board chargers have a growing market.

A main power topology of the on-board charger generally includes two parts, that is, power factor correction (PFC)+ bidirectional DC-DC, and the PFC plays a role of correcting a power factor. The bidirectional DC-DC implements controllable isolated transmission of energy, and is a core power conversion unit of the on-board charger. To meet requirements of high-power charging and discharging, a high-power bidirectional DC-DC circuit generally uses a multi-module parallel connection mode, that is, the parallel connection mode of two or more bidirectional DC-DC modules is used to implement higher-power charging. However, the multi-module parallel connection has some problems, and therefore has high requirements on a system hardware circuit design and a software algorithm.

SUMMARY

An objective of the present disclosure is to resolve one of technical problems in the related art at least to some extent.

Based on this, an embodiment of the present disclosure provides a DC-DC converter, which can implement switching between a high-power output and a low-power output in a light load mode, and has low costs and a simple structure.

Another embodiment of the present disclosure provides an on-board charger including the DC-DC converter.

Still another embodiment of the present disclosure provides an electric vehicle mounted with the on-board charger.

To achieve the objective, the DC-DC converter according to the embodiment of a first aspect of the present disclosure includes: a first three-phase bridge module, a resonance module, a second three-phase bridge module, and a controller, where the first three-phase bridge module is configured to: adjust frequency of an input signal of the DC-DC converter when a battery module of a vehicle is charged by the external, or rectify an output signal of the resonance module when the battery module is discharged by the external; the resonance module is configured to: resonate an output signal of the first adjustment module when the battery module of the vehicle is charged by the external, or resonate an output signal of the second adjustment module when the battery module is discharged by the external; the second three-phase bridge module is configured to: adjust frequency of an output signal of the battery module when the battery module of the vehicle is discharged by the external, or rectify the output signal of the resonance module when the battery module is charged by the external; and the controller is configured to: in a light load mode of the DC-DC converter, control the first three-phase bridge module to switch to a two-phase bridge arm input or a one-phase bridge arm input and control the second three-phase bridge module to switch to a two-phase bridge arm output when the battery module is charged by the external, or control the second three-phase bridge module to switch to a two-phase bridge arm input or a one-phase bridge arm input and control the first three-phase bridge module to switch to a two-phase bridge arm output when the battery module is discharged by the external.

According to the DC-DC converter of the embodiment of the present disclosure, compared with a common three-phase interleaved LLC resonant converter, the resonance module may resonate bidirectionally, implementing bidirectional energy transmission, and has a smaller output ripple current and low costs. In the light load mode, by reducing the quantity of working bridge arms and the quantity of working switch tubes, losses of the switch tubes can be reduced, and the working efficiency is improved.

To achieve the objective, the on-board charger according to the embodiment of a second aspect of the present disclosure includes: a three-phase PFC circuit and the DC-DC converter.

According to the embodiment of the present disclosure, by adopting the DC-DC converter according to the embodiment of the foregoing aspect, the on-board charger not only can implement higher-power charging and discharging, but also can reduce the switch losses in the light load mode, thereby improving the working efficiency.

To achieve the objective, the electric vehicle according to the embodiment of a third aspect of the present disclosure includes the on-board charger.

According to the embodiment of the present disclosure, by mounting the on-board charger according to the embodiment of the foregoing aspect, the electric vehicle not only can implement higher-power charging and discharging, but also can reduce the switch losses in the light load mode, thereby improving the working efficiency.

DETAILED DESCRIPTION

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be understood as a limitation to the present disclosure.

Figure 1:
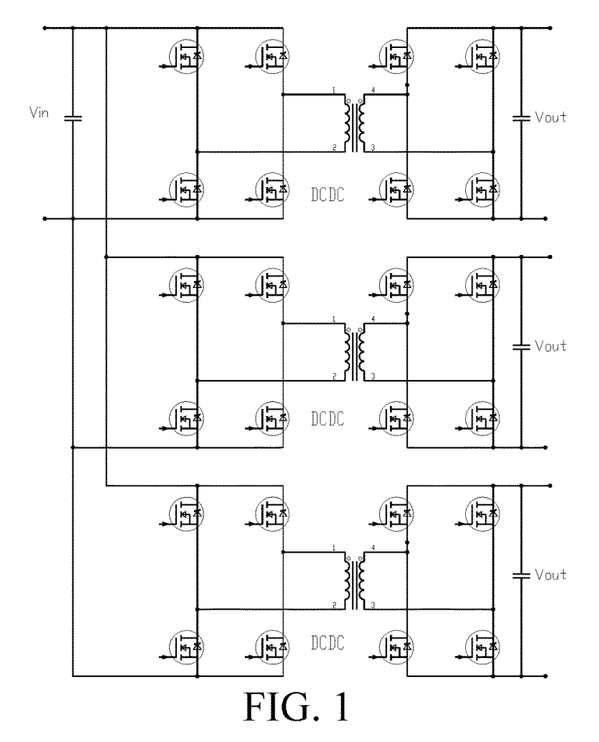
FIG. 1 is a schematic diagram of a circuit topology of a three-module parallel bidirectional DC-DC converter in the related art.

The embodiments of the present disclosure are based on understanding and research of the inventors on the following problems:

FIG. 1 is a schematic circuit diagram of a typical multi-module parallel bidirectional DC-DC converter. More modules connected in parallel are deduced by analogy. For some problems existing in the solution shown in FIG. 1, for example, high costs due to a large quantity of devices, each module requires an independent voltage, current sampling, and a drive control circuit, resulting in large redundancy, and it is difficult to optimize costs and a volume. In another example, it is still difficult to resolve a large output ripple current. To reduce a ripple current, each module still requires a larger filter capacitor. Certainly, a plurality of independent modules are subjected to phase interleaving to reduce the ripple current, but different modules are required to work cooperatively. A master and a slave are required to be provided, and there is a high coordination requirement. This proposes high requirements on both a system hardware circuit design and a software algorithm.

The DC-DC converter according to an embodiment of the present disclosure is described with reference to the accompanying drawings.

Figure 2:
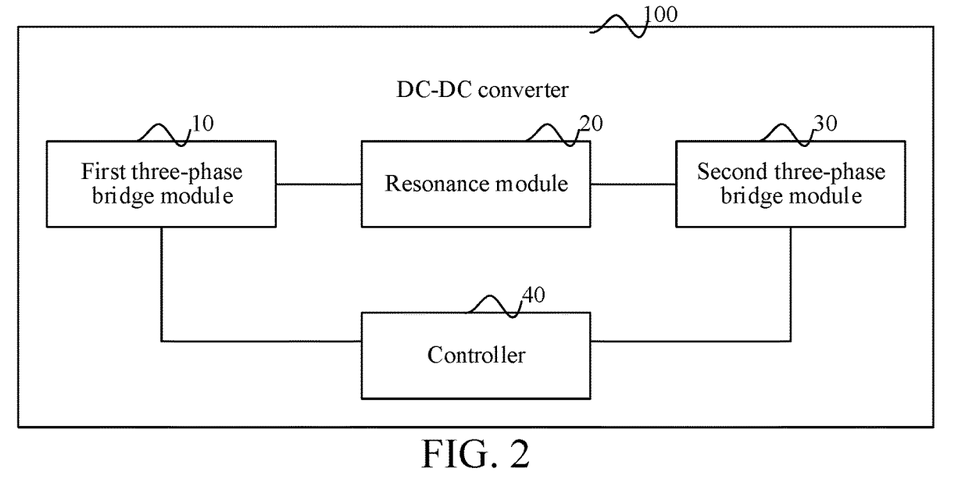
FIG. 2 is a block diagram of a DC-DC converter according to an embodiment of the present disclosure.

FIG. 2 is a block diagram of a DC-DC converter according to an embodiment of the present disclosure. As shown in FIG. 2, the DC-DC converter 100 according to the embodiment of the present disclosure includes a first three-phase bridge module 10, a resonance module 20, a second three-phase bridge module 30, and a controller 40.

The first three-phase bridge module 10 is configured to: adjust frequency of an input signal of the DC-DC converter 100 when a battery module of a vehicle is charged by the external, to adjust impedance of the resonance module 20, where the external may be a power grid or another power supply device. For example, the power grid charges the battery module. Alternatively, when the battery module is discharged by the external, where the external may be an electric load, for example, the battery module is discharged by the electric load, the first adjustment module 10 is configured to rectify and filter an output signal of the resonance module 20 for a back-end load. The external may be a device, an apparatus, or the like that can charge and discharge the battery module. This is not specifically limited in this embodiment of the present disclosure.

The resonance module 20 is configured to: resonate an output signal of the first three-phase bridge module 10 when the battery module of the vehicle is charged by the external, to generate a high-frequency resonant current, or resonate an output signal of the second three-phase bridge module 30 when the battery module is discharged by the external, to generate a high-frequency resonant current.

The second three-phase bridge module 30 is configured to: adjust frequency of an output signal of the battery module when the battery module of the vehicle is discharged by the external, to adjust the impedance of the resonance module 20, or rectify the output signal of the resonance module 20 when the battery module is charged by the external, to convert the high-frequency resonant current into a direct current to be provided for the battery module, thereby implementing charging of the battery module.

In the DC-DC converter 100 according to the embodiments of the present disclosure, the resonance module 20 is provided. The resonance module 20 may resonate to generate a high-frequency current when the battery module is charged and discharged. That is, bidirectional transmission of energy can be implemented.

Figure 3:
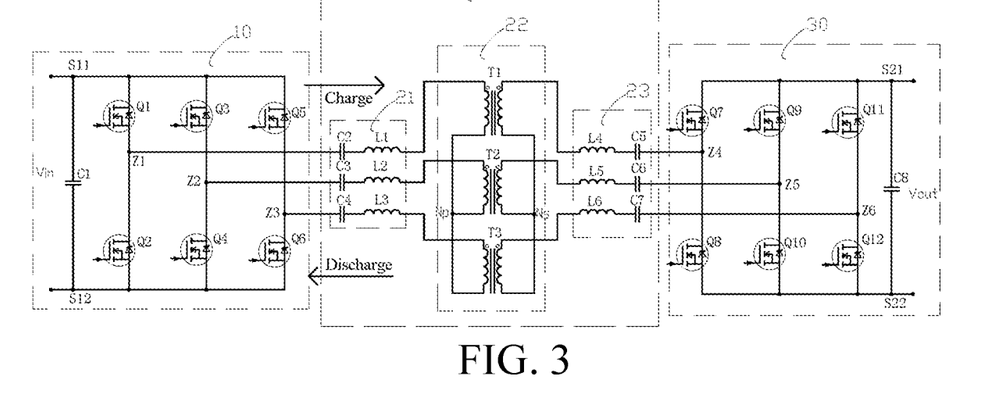
FIG. 3 is a schematic diagram of a circuit topology of a DC-DC converter according to an embodiment of the present disclosure.

FIG. 3 is a schematic diagram of a circuit topology of a DC-DC converter according to an embodiment of the present disclosure. As shown in FIG. 3, the resonance module 20 includes three primary LC units 21, a three-phase voltage transformation unit 22, and three secondary LC units 23.

When the battery module is charged by the external, the three primary LC units 21 and the three-phase voltage transformation unit 22 are configured to resonate the output signal of the first three-phase bridge module 10 to generate a high-frequency current. Further, the high-frequency current is converted into a direct current after being rectified and filtered by the second three-phase bridge module 30, and the direct current may be provided for the battery module of the vehicle, thereby implementing charging of the battery module. When the battery module is discharged by the external, the three secondary LC units 23 and the three-phase voltage transformation unit 22 are configured to resonate the output signal of the second three-phase bridge module 30 to generate the high-frequency current. The high-frequency current is converted into a direct current after being rectified and filtered by the first three-phase bridge module 10, and the direct current may be provided for a subsequent component for processing, so as to supply power to the load, thereby implementing discharging of the battery module of the vehicle.

In some embodiments of the present disclosure, one end of each primary LC unit 21 is connected to a phase line connection point of a corresponding phase bridge arm in the first three-phase bridge module 10, dotted terminals of primary coils of the three-phase voltage transformation unit 22 are separately connected to the other ends of the corresponding primary LC units 21, and undotted terminals of the primary coils of the three-phase voltage transformation unit 22 are connected together, to form a Y-type connection. Dotted terminals of secondary coils of the three-phase voltage transformation unit 22 are separately connected to one ends of the corresponding secondary LC units 23, and undotted terminals of the secondary coils of the three-phase voltage transformation unit 22 are connected together, to form a Y-type connection. The Y-type connection helps the three-phase bridge circuit implement automatic current sharing, thereby avoiding uneven power distribution caused by a device parameter deviation of the three-phase bridge circuit.

A phase line connection point of each phase bridge arm of the second three-phase bridge module 30 is connected to the other ends of the corresponding secondary LC units 23.

The controller 40 is separately connected to a control end of a switch tube of the first three-phase bridge module 10 and a control end of a switch tube of the second three-phase bridge module 30. The controller 40 may control the switch tubes of the first three-phase bridge module 10 and the second three-phase bridge module 30 according to charging and discharging signals, to implement three-phase input and output. Compared with single-phase or bidirectional output, a higher power can be provided.

In the embodiment of the present disclosure, the three-phase voltage transformation unit 22 may be wound with three independent magnetic cores or the same magnetic core.

In this embodiment, when the on-board battery module is charged by the external, each primary LC unit 21 and the primary coils of the corresponding voltage transformation unit 22 may form a resonant cavity of a corresponding input. The controller 40 performs high-frequency resonance control on the first three-phase bridge module 10 and rectification control on the second three-phase bridge module 30. The first three-phase bridge module 10, the three primary LC units 21, and the primary coils of the three-phase voltage transformation unit 22 form a three-phase interleaved LLC that works in a high-frequency resonant state and outputs a high-frequency current. The high-frequency current is converted into a direct current after being rectified by using the second three-phase bridge module 30, so that high-power charging of the vehicle battery module of the whole electric vehicle can be implemented.

When the battery module is discharged, each secondary LC unit 23 and the secondary coils of the corresponding voltage transformation unit 22 may form a resonant cavity of a corresponding input, the controller 40 performs high-frequency resonant control on the second three-phase bridge module 30 and rectification control on the first three-phase bridge module 10. The second three-phase bridge module 10, the three secondary LC units 23, and the secondary coils of the three-phase voltage transformation unit 22 form a three-phase interleaved LLC resonant converter that works in a high-frequency resonant state and outputs a high-frequency current. The high-frequency current is converted into a direct current after being rectified by using the first three-phase bridge module 10, so that the high-power discharging of the battery module can be implemented.

Figure 4:
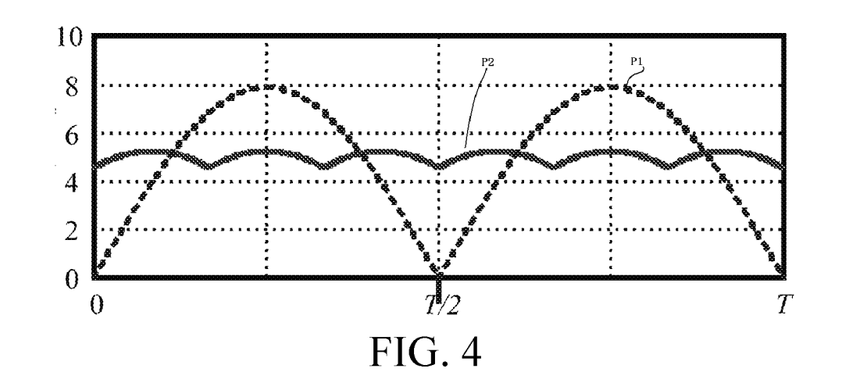
FIG. 4 is a schematic diagram of a waveform of a ripple current of a DC-DC converter in a three-phase operation according to an embodiment of the present disclosure.

Based on the DC-DC converter 100 of the embodiment of the present disclosure, an output ripple current is small. As shown in FIG. 4, P1 is a curve of an output ripple current of a common full-bridge circuit, and P2 is a curve of an output ripple current of the structure of the present application. Compared with the common full-bridge circuit, under the condition of the same output current $I_O$, the output ripple current of the common full-bridge circuit is $I_{ripple}=\pi I_O/2=1.57\ I_O$, while the output ripple current of the circuit based on the present application is $I_{ripple}=(2-\sqrt{3})I_O/2=0.14\ I_O$. Obviously, the output ripple current of the circuit in the present application is smaller, and the smaller ripple current helps reduce output filter capacitors.

The DC-DC converter 100 according to the embodiments of the present disclosure is a novel three-phase interleaved LLC resonant bidirectional converter, and compared with the high-power bidirectional DC-DC converter in the multi-module parallel connection mode shown in FIG. 1, there are fewer devices, and a ripple current is smaller, so that the high-power charging and discharging with a better effect can be implemented.

However, the on-board charger does not always work in a full-power state during working, in particular, the on-board charger often works in the light load mode in a discharge direction. All devices of a power loop of the three-phase interleaved resonant bidirectional DC-DC converter always work in a high-frequency working mode. To stabilize the output voltage under a light load condition, the system needs to improve the working frequency of the system to obtain a smaller gain, and to improve the working frequency means an increase in the losses of the switch tubes. Therefore, based on the circuit topological structure above, the system efficiency cannot be optimized in the light load mode.

It should be noted that, the light load mode means that within a load range of the circuit, a load rate is below 30%, or below 50%, where the light load is relative to a full load.

Based on the DC-DC converter 100 according to the embodiments of the present disclosure, a novel control method is provided, to implement switching between the high-power and low-power charging and discharging, so that the system efficiency can also be optimized in the light load mode. In this embodiment of the present disclosure, the controller 40 is configured to: in the light load mode of the DC-DC converter, control the first three-phase bridge module 10 to switch to a two-phase bridge arm input or a one-phase bridge arm input and control the second three-phase bridge module 30 to switch to a two-phase bridge arm output when the battery module of the vehicle is charged by the external, or control the second three-phase bridge module 30 to switch to a two-phase bridge arm input or a one-phase bridge arm input and control the first three-phase bridge module 10 to switch to a two-phase bridge arm output when the battery module is discharged by the external.

In the light load mode, the DC-DC converter 100 according to the embodiments of the present disclosure becomes a "two-phase" or a "one-phase" LLC interleaved resonant DC-DC converter. By reducing the quantity of working switch tubes of the resonant bridge arm, the switch losses can be reduced, and the working efficiency is improved. By reducing the quantity of working resonant bridge arms, the load of the working bridge arms is not excessively low, and the switch frequency of the system is not increased much compared with the full load, so that the switch losses of the switch tubes can be effectively reduced, and the working efficiency is improved.

According to the DC-DC converter 100 of the embodiment of the present disclosure, compared with the common three-phase interleaved LLC resonant converter, a resonant unit is added to a secondary side of the voltage transformation unit, to achieve bidirectional resonance and implement bidirectional energy transmission. In addition, the power distribution is uniform, and the output ripple current is smaller, resulting in low costs. In the light load mode, by reducing the quantity of working bridge arms and the quantity of working switch tubes, the switch losses can be reduced, thereby improving the working efficiency.

The units and connection relationships thereof in the present disclosure are further described below with reference to the accompanying drawings. In this embodiment, the first three-phase bridge module 10 and the second three-phase bridge module 30, a three-phase bridge structure may be formed by switch tubes such as MOS transistor or insulated gate bipolar transistors (IGBTs) or other elements. The LC unit may include capacitors and inductors. The voltage transformation unit may be implemented by a transformer structure.

In some embodiments of the present disclosure, as shown in FIG. 3, the first three-phase bridge module 10 includes a first one-phase bridge arm, a first two-phase bridge arm, and a first three-phase bridge arm. The first one-phase bridge arm includes a first switch tube Q1 and a second switch tube Q2, where one end of the first switch tube Q1 is connected to one end of the second switch tube Q2, and there is a first phase line connection point Z1 between one end of the first switch tube Q1 and one end of the second switch tube Q2. The first two-phase bridge arm includes a third switch tube Q3 and a fourth switch tube Q4, where one end of the third switch tube Q3 is connected to one end of the fourth switch tube Q4, and there is a second phase line connection point Z2 between one end of the third switch tube Q3 and one end of the fourth switch tube Q4. The first three-phase bridge arm includes a fifth switch tube Q5 and a sixth switch tube Q6, where one end of the fifth switch tube Q5 is connected to one end of the sixth switch tube Q6, and there is a third phase line connection point Z3 between one end of the fifth switch tube Q5 and one end of the sixth switch tube Q6. The other end of the first switch tube Q1, the other end of the third switch tube Q3, and the other end of the fifth switch tube Q5 are connected together to form a first end point S11 of the first three-phase bridge module, and the other end of the second switch tube Q2, the other end of the fourth switch tube Q4, and the other end of the sixth switch tube Q6 are connected together to form a second end point S12 of the first three-phase bridge module 10. The first end point S11 and the second end point S12 may be connected to other modules for input or output.

As shown in FIG. 3, the first three-phase bridge module 10 further includes a first capacitor C1, where one end of the first capacitor C1 is connected to the first end point S11 of the first three-phase bridge module 10, and the other end of the first capacitor C1 is connected to the second end point S12 of the first three-phase bridge module 10, and may filter an output or an input of the first three-phase bridge module 10.

As shown in FIG. 3, the three primary LC units 21 include a first primary LC unit, a second primary LC unit, and a third primary LC unit. The first primary LC unit includes a second capacitor C2 and a first inductor L1, where one end of the second capacitor C2 is connected to the first phase line connection point Z1, the other end of the second capacitor C2 is connected to one end of the first inductor L1, and the other end of the first inductor L1 is connected to dotted terminals of primary coils of a corresponding phase voltage transformation unit 22. The second primary LC unit includes a third capacitor C3 and a second inductor L2, where one end of the third capacitor C3 is connected to the second phase line connection point Z2, the other end of the third capacitor C3 is connected to one end of the second inductor L2, and the other end of the second inductor L2 is connected to dotted terminals of primary coils of a corresponding phase voltage transformation unit 22. The third primary LC unit includes a fourth capacitor C4 and a third inductor L3, where one end of the fourth capacitor C4 is connected to the third phase line connection point Z3, the other end of the fourth capacitor C4 is connected to one end of the third inductor L3, and the other end of the third inductor L3 is connected to dotted terminals of primary coils of a corresponding phase voltage transformation unit 22.

In the embodiment of the present disclosure, as shown in FIG. 3, the three-phase voltage transformation unit 22 includes a first phase voltage transformation unit T1, a second phase voltage transformation unit T2, and a third phase voltage transformation unit T3.

The first phase voltage transformation unit T1 includes a first primary coil and a first secondary coil, where dotted terminals of the first primary coil are connected to the other end of the first inductor L1, and dotted terminals of the first secondary coil are connected to one end of a corresponding secondary LC unit 23. The second phase voltage transformation unit T2 includes a second primary coil and a second secondary coil, where dotted terminals of the second primary coil are connected to the other end of the second inductor L2, and dotted terminals of the second secondary coil are connected to one end of a corresponding secondary LC unit 23. The third phase voltage transformation unit T3 includes a third primary coil and a third secondary coil, where dotted terminals of the third primary coil are connected to the other end of the third inductor L3, and dotted terminals of the third secondary coil is connected to one end of a corresponding secondary LC unit 23. Undotted terminals of the first primary coil, undotted terminals of the second primary coil, and undotted terminals of the third primary coil are connected together, for example, are connected to an NP, to form a Y-type connection. Undotted terminals of the first secondary coil, undotted terminals of the second secondary coils, and undotted terminals of the third secondary coils are connected together, for example, are connected to an NS, to form a Y-type connection. The Y-type connection may help the three-phase bridge module to implement automatic current sharing, thereby avoiding uneven power distribution caused by a device parameter deviation of the three-phase bridge circuit.

As shown in FIG. 3, the second three-phase bridge module 30 includes a second one-phase bridge arm, a second two-phase bridge arm, and a second three-phase bridge arm.

The second one-phase bridge arm includes a seventh switch tube Q7 and an eighth switch tube Q8, where one end of the seventh switch tube Q7 is connected to one end of the eighth switch tube Q8, and there is a fourth phase line connection point Z4 between one end of the seventh switch tube Q7 and one end of the eighth switch tube Q8. The second two-phase bridge arm includes a ninth switch tube Q9 and a tenth switch tube Q10, where one end of the ninth switch tube Q9 is connected to one end of the tenth switch tube Q10, and there is a fifth phase line connection point Z5 between one end of the ninth switch tube Q9 and one end of the tenth switch tube Q10. The second three-phase bridge arm includes an eleventh switch tube Q11 and a twelfth switch tube Q12, where one end of the eleventh switch tube Q11 is connected to one end of the twelfth switch tube Q12, and there is a sixth phase line connection point Z6 between one end of the eleventh switch tube Q11 and one end of the twelfth switch tube Q12. The other end of the seventh switch tube Q7, the other end of the ninth switch tube Q9, and the other end of the eleventh switch tube Q11 are connected together to form a first end point S21 of the second three-phase bridge module 30. The other end of the eighth switch tube Q8, the other end of the tenth switch tube Q10, and the other end of the twelfth switch tube Q12 are connected together to form a second end point S22 of the second three-phase bridge module 30. The first end point S21 and the second end point S22 may be connected to other modules for input or output.

As shown in FIG. 3, the second three-phase bridge module 30 further includes a fifth capacitor C5, where one end of the fifth capacitor C5 is connected to the first end point S21 of the second three-phase bridge module 30, and the other end of the fifth capacitor C5 is connected to the second end point S22 of the second three-phase bridge module 30. The fifth capacitor C5 may filter an output or an input of the second three-phase bridge module 30.

In some embodiments of the present disclosure, as shown in FIG. 3, the three secondary LC units 23 include a first secondary LC unit, a second secondary LC unit, and a third secondary LC unit.

The first secondary LC unit includes a fourth inductor L4 and a sixth capacitor C6, where one end of the fourth inductor L4 is connected to the dotted terminals of the first secondary coil, the other end of the fourth inductor L4 is connected to one end of the sixth capacitor C6, and the other end of the sixth capacitor C6 is connected to the fourth phase line connection point Z4. The second secondary LC unit includes a fifth capacitor L5 and a seventh capacitor C7, where one end of the fifth capacitor L5 is connected to the dotted terminals of the second secondary coil, the other end of the fifth inductor L5 is connected to one end of the seventh capacitor C7, and the other end of the seventh capacitor C7 is connected to the fifth phase line connection point Z5. The third secondary LC unit includes a sixth inductor L6 and an eighth capacitor C8, where one end of the sixth inductor L6 is connected to the dotted terminals of the third secondary coil, the other end of the sixth inductor L6 is connected to one end of the eighth capacitor C8, and the other end of the eighth capacitor C8 is connected to the sixth phase line connection point Z6.

In some embodiments, for forward charging, the first three-phase bridge module 10 is connected to the charging input, and the second three-phase bridge module 30 is connected to the battery module of the electric vehicle. The second capacitor C2, the first inductor L1, and the first primary coil form a resonant cavity of the first one-phase bridge arm; the third capacitor C3, the second inductor L2, and the second primary coil form a resonant cavity of the first two-phase bridge arm; and the fourth capacitor C4, the third capacitor L3, and the third primary coil form a resonant cavity of the first three-phase bridge arm. In some embodiments, the second capacitor C2, the third capacitor C3, and the fourth capacitor C4 are referred to as primary resonant capacitors, and the first inductor L1, the second inductor L2, and the third inductor L3 are referred to as primary resonant inductors.

When the battery module of the vehicle is charged by the external, each phase bridge arm of the first three-phase bridge module 10 and the corresponding resonance module form three-phase interleaved LLC that works in a high-frequency resonant state. The controller 40 controls the first switch tube Q1, the second switch tube Q2, the third switch tube Q3, the fourth switch tube Q4, the fifth switch tube Q5, and the sixth switch tube Q6 to turn on/off alternately at a duty ratio of 50%; controls the first switch tube Q1, the third switch tube Q3, and the fifth switch tube Q5 to turn on/off with a mutual phase difference of 120°; controls the second switch tube Q2, the fourth switch tube Q4, and the sixth switch tube Q6 to turn on/off with a mutual phase difference of 120°; and performs rectification control on the second three-phase bridge module 30. The second three-phase bridge module 30 is used as a secondary three-phase rectifier bridge, and a high-frequency current is converted into a direct current after being rectified by a diode in a switch tube body of the second three-phase bridge module 30, and the direct current is provided for a high-voltage battery module of the whole vehicle. Generally, as shown in FIG. 4, each switch tube includes a diode element, which may be referred to as a switch tube diode. If a drive signal is transmitted to the switch tubes of the second three-phase bridge module 30, the second three-phase bridge module 30 forms a synchronous rectification circuit, thereby further improving product efficiency.

In some embodiments, for discharging of the battery module, the first three-phase bridge module 10 is connected to an electricity consumption side, and the second three-phase bridge module 30 is connected to the battery module of the electric vehicle. The sixth capacitor C6, the fourth inductor L4, and the first secondary coil form a resonant cavity of the second one-phase bridge arm; the seventh capacitor C7, the fifth inductor L5, and the second secondary coil form a resonant cavity of the second two-phase bridge arm; and the eighth capacitor C8, the sixth inductor L6, and the third secondary coil form a resonant cavity of the second three-phase bridge arm. In some embodiments, the sixth capacitor C6, the seventh capacitor C7, and the eighth capacitor C8 are referred to as secondary resonant capacitors, and the fourth inductor L4, the fifth inductor L5, and the sixth inductor L6 are referred to as secondary resonant inductors.

When the battery module is discharged by the external, each phase bridge arm of the second three-phase bridge module 30 and the corresponding resonance module form three-phase interleaved LLC that works in a high-frequency resonant state. The controller 40 controls the seventh switch tube Q7, the eighth switch tube Q8, the ninth switch tube Q9, the tenth switch tube Q10, the eleventh switch tube Q11, and the twelfth switch tube Q12 to turn on/off alternately at a duty ratio of 50%; controls the seventh switch tube Q7, the ninth the switch tube Q9, and the eleventh switch tube Q11 to turn on/off at a mutual phase difference of 120°; controls the eighth switch tube Q8, the tenth switch tube Q10, and the twelfth switch tube Q12 to turn on/off at a mutual phase difference of 120°; and performs rectification control on the first three-phase bridge module 10. The first three-phase bridge module 30 is used as a discharge output three-phase rectifier bridge. A high-frequency current is converted into a direct current after being rectified by a diode in a switch tube body of the first three-phase bridge module 30, and the direct current is provided for a module at the electricity consumption output side. If a drive signal is transmitted to the switch tubes of the first three-phase bridge module 10, the first three-phase bridge module 10 forms a synchronous rectification circuit, thereby further improving the product efficiency.

The foregoing embodiments describe the process for implementing the high-power charging and discharging based on the DC-DC converter 100 according to the embodiments of the present disclosure shown in FIG. 3. The following describes the implementation of charging and discharging in the light load mode in this embodiment of the present disclosure.

In some embodiments of the present disclosure, in the light load mode, when the battery module of the vehicle is charged by the external, the controller 40 controls the fifth switch tube Q5 and the sixth switch tube Q6 to be in a normally-off state and the eleventh switch tube Q11 and the twelfth switch tube Q12 to be in a normally-off state. That is, a corresponding bridge arm of a primary/secondary side in the resonance module 20 is turned off, for example, the third phase bridge arm on the primary/secondary side is turned off. In this case, the system topology is equivalent to that shown in FIG. 5, and the DC-DC converter 100 according to the embodiments of the present disclosure becomes the "two-phase" LLC interleaved resonant DC-DC converter. The second capacitor C2, the first inductor L1, the first phase voltage transformation unit T1, the third capacitor C3, the second inductor L3, and the second phase voltage transformation unit T2 are in a series mode. If equivalent parameters of the resonant cavity are unchanged, the circuit topology shown in FIG. 5 becomes a full-bridge DC-DC converter adopting synchronous rectification at the secondary side, so that the charging requirements in the light load mode can be met, without increasing the losses of the switch tubes.

Figure 5:
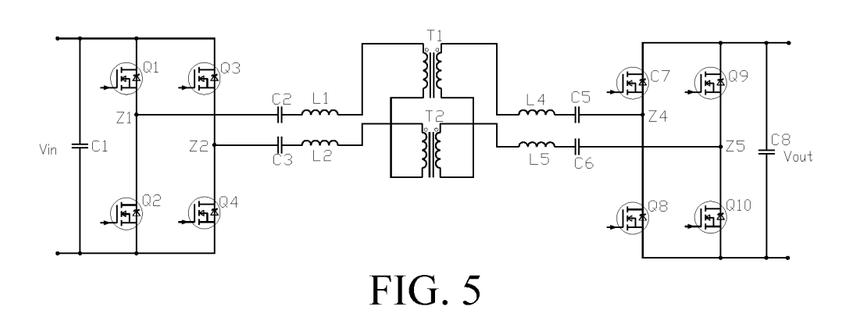
FIG. 5 is a schematic diagram of a circuit topology of a DC-DC converter switching to a two-phase bridge arm input during charging in a light load mode according to an embodiment of the present disclosure.

Alternatively, in the light load mode, when the battery module of the vehicle is charged by the external, the controller 40 controls the eleventh switch tube Q11 and the twelfth switch tube Q12 to be in a normally-off state and the fifth switch tube Q5 and the sixth switch tube Q6 to be in a normally-off state. Similarly, the DC-DC converter 100 according to the embodiments of the present disclosure becomes the "two-phase" LLC interleaved resonant DC-DC converter, and the primary side is a full-bridge structure adopting the synchronous rectification, so that the discharging requirements in the light load mode can be met, without increasing the losses of the switch tubes.

Figure 6:
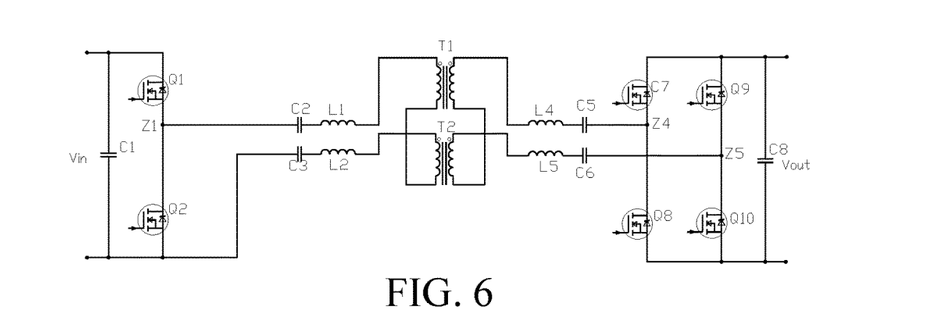
FIG. 6 is a schematic diagram of a circuit topology of a DC-DC converter switching to a one-phase bridge arm input during charging in a light load mode according to an embodiment of the present disclosure.

In other some embodiments of the present disclosure, in the light load mode, when the battery module of the vehicle is charged by the external, the controller 40 controls the fifth switch tube Q5 and the sixth switch tube Q6 to be in a normally-off state, the third switch tube Q3 to be in a normally-off state, the fourth switch tube Q4 to be in a normally-on state, and the eleventh switch tube Q11 and the twelfth switch tube Q12 to be in a normally-off state. That is, on the basis of FIG. 5, upper switch tubes on the first two-phase bridge arm at the primary side are kept normally off, and lower switch tubes are kept normally on. The topology structure becomes the "one-phase" LLC interleaved resonant DC-DC converter, and an equivalent circuit topology diagram is shown in FIG. 6. In this case, a secondary output side is the full-bridge synchronous rectification circuit structure. It should be noted that as the topological structure has changed, if the working frequency is unchanged, the output voltage of the system is halved. To keep the output voltage unchanged, the working frequency needs to be reduced to improve gain characteristics of the system.

Alternatively, when the battery module is discharged by the external, the controller 40 controls the eleventh switch tube Q11 and the twelfth switch tube Q12 to be in a normally-off state, the ninth switch tube Q9 to be in a normally-off state, the tenth switch tube Q10 to be in a normally-on state, and the fifth switch tube Q5 and the sixth switch tube Q6 to be in a normally-off state. Similarly, the DC-DC converter 100 according to the embodiments of the present disclosure becomes the "one-phase" LLC interleaved resonant DC-DC converter, and the primary side becomes the full-bridge structure adopting the synchronous rectification, so that the discharging requirements in the light load mode can be met, without increasing the losses of the switch tubes.

Figure 7:
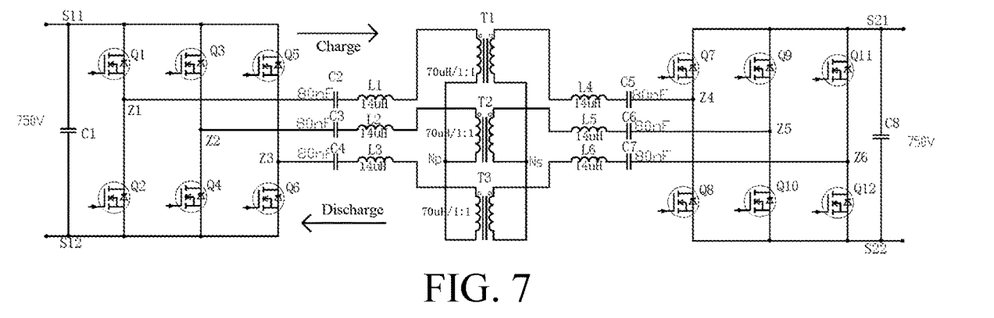
FIG. 7 is a schematic diagram of a circuit topology of a DC-DC converter according to an embodiment of the present disclosure.

A 20-KW three-phase interleaved LLC bidirectional DC-DC converter is used as an example for description below. Design requirements are as follows: rated values of the input voltage and the output voltage of the DC-DC converter are both 750 V, and full-load powers in the charging direction and the discharging direction are both 20 KW. For parameter settings of the resonant cavities, because the forward charging voltages and powers are equal, the resonant cavity corresponding to the first three-phase bridge module 10, for example, referred to as the primary resonant cavity, and the resonant cavity corresponding to the second three-phase bridge module 30, for example, referred to as the secondary resonant cavity, have the same parameters. It is assumed that the resonant frequency of the circuit is 150 KHZ, and it can be obtained according to the relevant calculation formula of the three-phase interleaved LLC circuit that: primary resonant capacitance C2=C3=C4=secondary resonant capacitance C5=C6=C7=80 nF, primary resonant inductance L1=L2=L3=secondary resonant inductance L4=L5=L6=14 pH, a turn ratio of the three-phase voltage transformation unit 22 T1=T2=T3=1:1, and inductance of the primary coils of the three-phase voltage transformation unit 22 $T_{1-1}=T_{2-1}=T_{3-1}$=inductance of the secondary coils=$T_{1-2}=T_{2-2}=T_{3-2}$=70 pH. According to consideration on the current and voltage requirements, heat dissipation requirements and the like, the switch tubes Q1 to Q12 are 1200 V/40 mΩ silicon carbide metal oxide semiconductor (MOS) transistors. For details, refer to FIG. 7.

Figure 8:
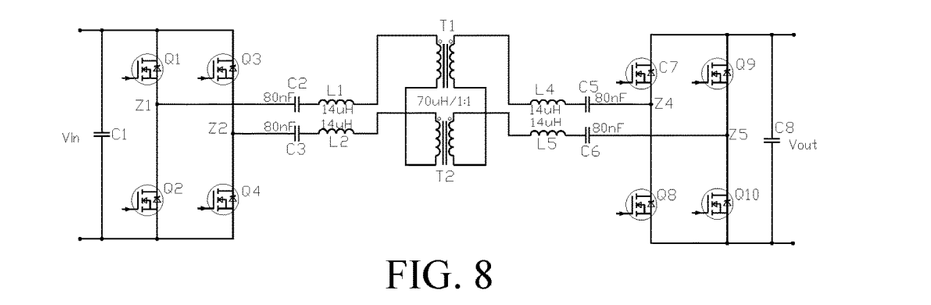
FIG. 8 is a schematic diagram of a circuit topology of switching to a two-phase bridge arm input during charging in a light load mode for FIG. 7.
Figure 9:
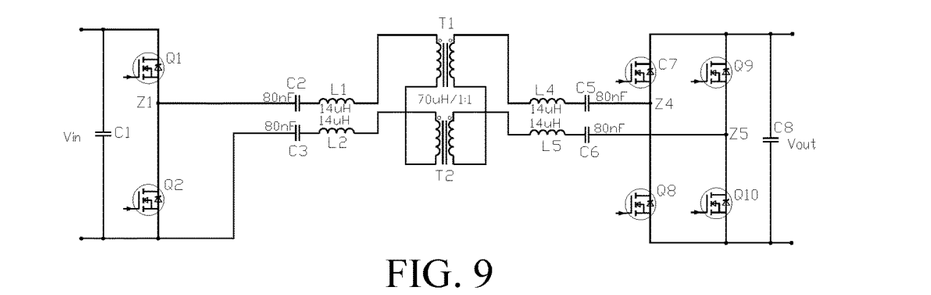
FIG. 9 is a schematic diagram of a circuit topology of switching to a one-phase bridge arm input during charging in a light load mode for FIG. 7.

The charging direction in the light load mode is used as an example. When one of the phase bridge arms, for example, the third phase bridge arm, is turned off, that is, when the DC-DC converter is switched to the two-phase bridge arm input and the two-phase bridge arm output, an equivalent circuit schematic diagram is shown in FIG. 8. When the two-phase bridge arm input is turned off, that is, when the DC-DC converter is switched to the one-phase input and a two-phase full-bridge rectified output, the equivalent circuit schematic diagram is shown in FIG. 9.

Compared with the common three-phase full-bridge DC-DC converter, the DC-DC converter 100 according to the embodiment of the present disclosure adds three resonant units at a transformer secondary side, and the second three-phase bridge module 30 uses a controllable switch tube.

For the high-power charging and discharging, the bidirectional resonance can implement bidirectional transmission of energy, and the transmission in both directions works in a soft switch mode. The three-phase interleaved LLC is formed, which can implement higher power conversion, and compared with the common three-phase interleaved LLC, fewer power switch tubes are used. In addition, the three-phase voltage transformation unit 22 can implement automatic current sharing of the three-phase bridge circuit by adopting the Y-type connection method, to avoid uneven power distribution. Based on the circuit structure of the DC-DC converter 100 according to the embodiments of the present disclosure, the output ripple current is smaller, and the smaller ripple current can reduce output filter capacitors, thereby helping reduce the costs and reduce the product volume.

For the light load mode, the one-phase bridge arm or the two-phase bridge arm in the three-phase bridge is selected according to the load. By reducing the quantity of working switch tubes of the resonant bridge arms or reducing the quantity of the resonant bridge arms, the losses of the switch tubes can be reduced, and the working efficiency of the system is improved.

Based on the DC-DC converter according to the embodiment of the foregoing aspect, the on-board charger according to an embodiment of the present disclosure is described below with reference to the accompanying drawings.

Figure 10:
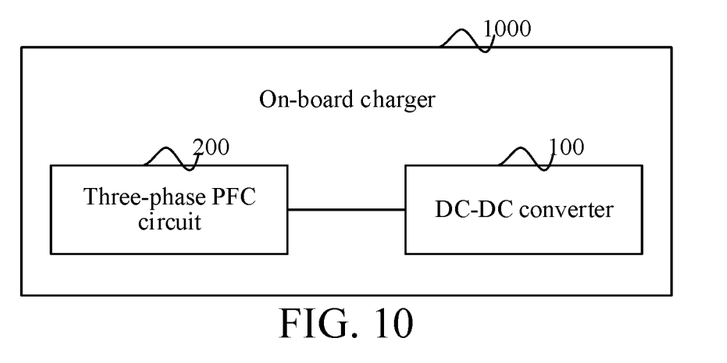
FIG. 10 is a block diagram of an on-board charger according to an embodiment of the present disclosure.

FIG. 10 is a block diagram of an on-board charger according to an embodiment of the present disclosure. As shown in FIG. 10, the on-board charger 1000 according to the embodiment of the present disclosure includes a three-phase PFC circuit 200 and the DC-DC converter 100 according to the foregoing embodiments. The three-phase PFC circuit 200 plays a role of correcting a power factor, and the DC-DC converter 100 implements a controllable isolated transmission of energy. For a specific structure and working process of the DC-DC converter 100, refer to the description in the foregoing embodiments.

According to the embodiment of the present disclosure, by adopting the DC-DC converter 100 according to the embodiment of the foregoing aspect, the on-board charger 1000 not only can implement the higher-power charging and discharging, but also can meet charging and discharging control in the light load mode, and the switch losses are reduced in the light load mod, thereby improving the working efficiency.

Figure 11:
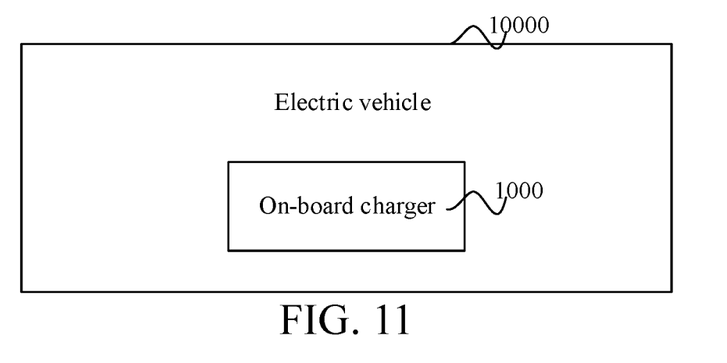
FIG. 11 is a block diagram of an electric vehicle according to an embodiment of the present disclosure.

FIG. 11 is a block diagram of an electric vehicle according to an embodiment of the present disclosure. As shown in FIG. 9, the electric vehicle 10000 according to the embodiment of the present disclosure includes the on-board charger 1000 according to the embodiment of the foregoing aspect.

According to the embodiment of the present disclosure, by mounting the on-board charger 1000 according to the embodiment of the foregoing aspect, the electric vehicle 10000 not only can implement the higher-power charging and discharging, but also can meet charging and discharging control in the light load mode, and the switch losses are reduced in the light load mod, thereby improving the working efficiency.

In the descriptions of this specification, descriptions using reference terms "an embodiment", "some embodiments", "an example", "a specific example", or "some examples" mean that specific characteristics, structures, materials, or features described with reference to the embodiment or example are included in at least one embodiment or example of the present disclosure. In this specification, exemplary descriptions of the terms are not necessarily directed to the same embodiment or example. In addition, the described specific characteristics, structures, materials, or features may be combined in an appropriate manner in any one or more embodiments or examples. In addition, with no conflict, a person skilled in the art can combine or group different embodiments or examples that are described in this specification and characteristics of the different embodiments or examples.

Although the embodiments of the present disclosure are shown and described above, it can be understood that, the foregoing embodiments are exemplary, and cannot be construed as a limitation to the present disclosure. A person of ordinary skill in the art may make changes, modifications, replacements, and variations to the foregoing embodiments within the scope of the present disclosure.

What is claimed is:

1. A DC-DC converter, comprising:
a first three-phase bridge module, a resonance module, a second three-phase bridge module, and a controller, wherein:
the first three-phase bridge module is configured to: adjust frequency of an input signal of the DC-DC converter when a battery module of a vehicle is charged by an external power supply, and rectify an output signal of the resonance module when the battery module is discharged by the external power supply;
the resonance module is configured to: resonate an output signal of a first adjustment module when the battery module of the vehicle is charged by the external power supply, and resonate an output signal of a second adjustment module when the battery module is discharged by the external power supply;
the second three-phase bridge module is configured to: adjust frequency of an output signal of the battery module when the battery module of the vehicle is discharged by the external power supply, and rectify the output signal of the resonance module when the battery module is charged by the external power supply; and
the controller, separately connected to a control end of the first three-phase bridge module and a control end of the second three-phase bridge module, is configured to: in a light load mode of the DC-DC converter, (a) control the first three-phase bridge module to switch to a two-phase bridge arm input or a one-phase bridge arm input and control the second three-phase bridge module to switch to a two-phase bridge arm output when the battery module is charged by the external power supply, and (b) control the second three-phase bridge module to switch to a two-phase bridge arm input or a one-phase bridge arm input and control the first three-phase bridge module to switch to a two-phase bridge arm output when the battery module is discharged by the external power supply.

2. The DC-DC converter according to claim 1, wherein:
the resonance module comprises three primary LC circuits, a three-phase voltage transformation unit, and three secondary LC circuits;
when the battery module is charged by the external power supply, the three primary LC circuits and the three-phase voltage transformation unit are configured to resonate the output signal of the first adjustment module to generate a high-frequency current; and
when the battery module is discharged by the external power supply, the three secondary LC circuits and the three-phase voltage transformation unit are configured to resonate the output signal of the second adjustment module to generate a high-frequency current.

3. The DC-DC converter according to claim 2, wherein:
one end of each primary LC circuit of the three primary LC circuits is connected to a phase line connection point of a corresponding phase bridge module in the first three-phase bridge module;
dotted terminals of primary coils of the three-phase voltage transformation unit are separately connected to the other ends of the corresponding primary LC circuits;
undotted terminals of the primary coils of the three-phase voltage transformation unit are connected together;
dotted terminals of secondary coils of the three-phase voltage transformation unit are separately connected to one ends of corresponding secondary LC circuits of the three secondary LC circuits;
undotted terminals of the secondary coils of the three-phase voltage transformation unit are connected together;
a phase line connection point of each phase bridge arm of the second three-phase bridge module is connected to the other end of a corresponding secondary LC circuit of the three secondary LC circuits; and
the controller is separately connected to a control end of a switch tube of the first three-phase bridge module and a control end of a switch tube of the second three-phase bridge module.

4. The DC-DC converter according to claim 3, wherein the first three-phase bridge module comprises:
a first one-phase bridge arm, comprising a first switch tube and a second switch tube, wherein one end of the first switch tube is connected to one end of the second switch tube, and there is a first phase line connection point between said one end of the first switch tube and said one end of the second switch tube;

a first two-phase bridge arm, comprising a third switch tube and a fourth switch tube, wherein one end of the third switch tube is connected to one end of the fourth switch tube, and there is a second phase line connection point between said one end of the third switch tube and said one end of the fourth switch tube; and a first three-phase bridge arm, comprising a fifth switch tube and a sixth switch tube, wherein one end of the fifth switch tube is connected to one end of the sixth switch tube, and there is a third phase line connection point between said one end of the fifth switch tube and said one end of the sixth switch tube, wherein the other end of the first switch tube, the other end of the third switch tube, and the other end of the fifth switch tube are connected together to form a first end point of the first three-phase bridge module, and the other end of the second switch tube, the other end of the fourth switch tube, and the other end of the sixth switch tube are connected together to form a second end point of the first three-phase bridge module.

5. The DC-DC converter according to claim 4, wherein the first three-phase bridge module further comprises:

a first capacitor, wherein one end of the first capacitor is connected to the first end point of the first three-phase bridge module, and the other end of the first capacitor is connected to the second end point of the first three-phase bridge module.

6. The DC-DC converter according to claim 4, wherein the controller is configured to control at least one of the first switch tube, the second switch tube, the third switch tube, the fourth switch tube, the fifth switch tube, and the sixth switch tube to turn on and off alternately at a duty ratio of 50%.

7. The DC-DC converter according to claim 4, wherein the controller is configured to control the first switch tube, the third switch tube, and the fifth switch tube to turn on and off with a phase difference of 120° from each other.

8. The DC-DC converter according to claim 4, wherein the controller is configured to control the second switch tube, the fourth switch tube, and the sixth switch tube to turn on and off with a phase difference of 120° from each other.

9. The DC-DC converter according to claim 4, wherein the three primary LC circuits comprise:

a first primary LC circuit, comprising a second capacitor and a first inductor, wherein one end of the second capacitor is connected to the first phase line connection point, the other end of the second capacitor is connected to one end of the first inductor, and the other end of the first inductor is connected to dotted terminals of primary coils of a corresponding phase voltage transformation unit;

a second primary LC circuit, comprising a third capacitor and a second inductor, wherein one end of the third capacitor is connected to the second phase line connection point, the other end of the third capacitor is connected to one end of the second inductor, and the other end of the second inductor is connected to dotted terminals of primary coils of a corresponding phase voltage transformation unit; and a third primary LC circuit, comprising a fourth capacitor and a third inductor, wherein one end of the fourth capacitor is connected to the third phase line connection point, the other end of the fourth capacitor is connected to one end of the third inductor, and the other end of the third inductor is connected to dotted terminals of primary coils of a corresponding phase voltage transformation unit.

10. The DC-DC converter according to claim 9, wherein the three-phase voltage transformation unit comprises:

a first phase voltage transformation unit, comprising a first primary coil and a first secondary coil, wherein dotted terminals of the first primary coil are connected to the other end of the first inductor, and dotted terminals of the first secondary coil are connected to one end of a corresponding secondary LC circuit;

a second phase voltage transformation unit, comprising a second primary coil and a second secondary coil, wherein dotted terminals of the second primary coil are connected to the other end of the second inductor, and dotted terminals of the second secondary coil are connected to one end of a corresponding secondary LC circuit; and a third phase voltage transformation unit, comprising a third primary coil and a third secondary coil, wherein dotted terminals of the third primary coil are connected to the other end of the third inductor, and dotted terminals of the third secondary coil are connected to one end of a corresponding secondary LC circuit, wherein undotted terminals of the first primary coil, undotted terminals of the second primary coil, and undotted terminals of the third primary coil are connected together, and undotted terminals of the first secondary coil, undotted terminals of the second secondary coils, and undotted terminals of the third secondary coils are connected together.

11. The DC-DC converter according to claim 10, wherein the undotted terminals of the first primary coil, undotted terminals of the second primary coil, and undotted terminals of the third primary coil are connected together to form a Y-type connection.

12. The DC-DC converter according to claim 10, wherein the undotted terminals of the first secondary coil, undotted terminals of the second secondary coils, and undotted terminals of the third secondary coils are connected together to form a Y-type connection.

13. The DC-DC converter according to claim 10, wherein the second three-phase bridge module comprises:

a second one-phase bridge arm, comprising a seventh switch tube and an eighth switch tube, wherein one end of the seventh switch tube is connected to one end of the eighth switch tube, and there is a fourth phase line connection point between said one end of the seventh switch tube and said one end of the eighth switch tube;

a second two-phase bridge arm, comprising a ninth switch tube and a tenth switch tube, wherein one end of the ninth switch tube is connected to one end of the tenth switch tube, and there is a fifth phase line connection point between said one end of the ninth switch tube and said one end of the tenth switch tube; and a second three-phase bridge arm, comprising an eleventh switch tube and a twelfth switch tube, wherein one end of the eleventh switch tube is connected to one end of the twelfth switch tube, and there is a sixth phase line connection point between said one end of the eleventh switch tube and said one end of the twelfth switch tube, wherein the other end of the seventh switch tube, the other end of the ninth switch tube, and the other end of the eleventh switch tube are connected together to form a first end point of the second three-phase bridge module, and the other end of the eighth switch tube, the other end of the tenth switch tube, and the other end of the twelfth switch tube are connected together to form a second end point of the second three-phase bridge module.

14. The DC-DC converter according to claim 13, wherein the second three-phase bridge module further comprises:
a fifth capacitor, wherein one end of the fifth capacitor is connected to the first end point of the second three-phase bridge module, and the other end of the fifth capacitor is connected to the second end point of the second three-phase bridge module.

15. The DC-DC converter according to claim 13, wherein the three secondary LC circuits comprise:
a first secondary LC circuit, comprising a fourth inductor and a sixth capacitor, wherein one end of the fourth inductor is connected to the dotted terminals of the first secondary coil, the other end of the fourth inductor is connected to one end of the sixth capacitor, and the other end of the sixth capacitor is connected to the fourth phase line connection point;
a second secondary LC circuit, comprising a fifth capacitor and a seventh capacitor, wherein one end of the fifth capacitor is connected to the dotted terminals of the second secondary coil, the other end of the fifth inductor is connected to one end of the seventh capacitor, and the other end of the seventh capacitor is connected to the fifth phase line connection point; and
a third secondary LC circuit, comprising a sixth inductor and an eighth capacitor, wherein one end of the sixth inductor is connected to the dotted terminals of the third secondary coil, the other end of the sixth inductor is connected to one end of the eighth capacitor, and the other end of the eighth capacitor is connected to the sixth phase line connection point.

16. The DC-DC converter according to claim 15, wherein in the light load mode of the DC-DC converter, the controller is configured to:
control the fifth switch tube and the sixth switch tube to be in a normally-off state, and the eleventh switch tube and the twelfth switch tube to be in a normally-off state when the battery module is charged by the external power supply; and
control the eleventh switch tube and the twelfth switch tube to be in a normally-off state, and the fifth switch tube and the sixth switch tube to be in a normally-off state when the battery module is discharged by the external power supply.

17. The DC-DC converter according to claim 15, wherein in the light load mode, the controller is configured to:
control the fifth switch tube and the sixth switch tube to be in a normally-off state, the third switch tube to be in a normally-off state, the fourth switch tube to be in a normally-on state, and the eleventh switch tube and the twelfth switch tube to be in a normally-off state when the battery module is charged by the external power supply; and
control the eleventh switch tube and the twelfth switch tube to be in a normally-off state, the ninth switch tube to be in a normally-off state, the tenth switch tube to be in a normally-on state, and the fifth switch tube and the sixth switch tube to be in a normally-off state when the battery module is discharged by the external power supply.

18. An on-board charger, comprising a three-phase power factor correction (PFC) circuit, and the DC-DC converter according to claim 1.

19. An electric vehicle, comprising an on-board charger according to claim 18.

20. The DC-DC converter according to claim 1, wherein an output ripple current of the DC-DC converter is smaller than an output current of the DC-DC converter.

* * * * *